Nov. 30, 1954     J. M. CHAMBERS     2,695,867
COMBINATION EXTRACTION AND DISTILLATION PROCESS
Filed Jan. 27, 1950
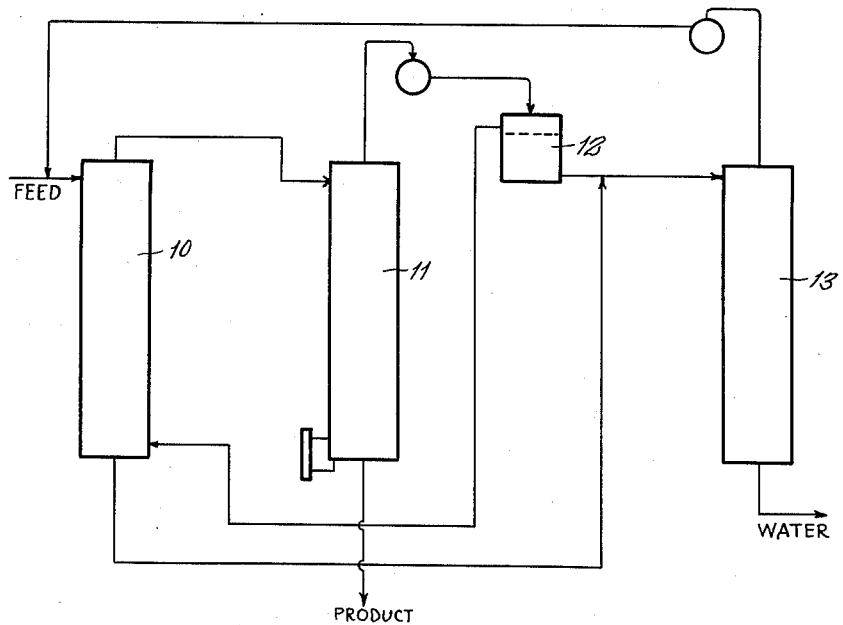
INVENTOR.
JOHN M. CHAMBERS
BY
Campbell, Brumbaugh, Free & Graves
his ATTORNEYS

United States Patent Office 2,695,867
Patented Nov. 30, 1954

2,695,867

COMBINATION EXTRACTION AND DISTILLATION PROCESS

John M. Chambers, Winchester, Mass., assignor, by mesne assignments, to Stone & Webster Engineering Corporation, Boston, Mass., a corporation of Massachusetts Application January 27, 1950, Serial No. 140,831

10 Claims. (Cl. 202—42)

This invention relates to the separation of mixtures such as mixtures of water and an organic compound, and includes the combination of an extraction step with an azeotropic distillation step, wherein the selective solvent used in the extraction step is the entrainer used in the azeotropic distillation step; and it relates more particularly to a process for recovering anhydrous oxygenated organic compounds from mixtures thereof with water, using a hydrocarbon as the selective solvent in the extracting step and then as the entrainer for the water in the azeotropic distillation step.

Great savings in steam cost are obtained by the process of the invention, and this is a very important factor in the cost of materials which are produced on a large volume scale.

The objects achieved in accordance with the invention as described herein include the provision of a process for separating mixtures of two or more components, by treating such a mixture with a selective solvent for one of the components of the mixture to form an extract thereof, and subjecting this extract to an azeotropic distillation; the provision of a process for the production of anhydrous n-propanol from a constant boiling mixture thereof with water wherein the mixture is extracted with a hydrocarbon to form a hydrocarbon extract phase richer in n-propanol than the constant boiling mixture, and subjecting the extract phase to an azeotropic distillation wherein the hydrocarbon is an entrainer for the water; the provision of a process for recovering anhydrous methyl ethyl ketone from a constant boiling mixture thereof with water wherein the mixture is extracted with a hydrocarbon to form an extract phase richer in methyl ethyl ketone than the mixture, and subjecting the extract phase to an azeotropic distillation wherein the hydrocarbon is an entrainer for the water; the provision of a process for recovering anhydrous pyridine from a constant boiling mixture thereof with water, wherein the mixture is extracted with a hydrocarbon to form an extract phase richer in pyridine than the mixture, and subjecting the extract phase to an azeotropic distillation wherein the hydrocarbon is an entrainer for the water; and other objects which will be apparent as details and embodiments of the invention are set forth hereinafter.

The invention will be described with reference to the accompanying drawing, wherein the figure is a diagrammatic illustration of apparatus which may be used for the process of the invention. For convenience, the usual or known devices or procedures, e. g., condensers, coolers, valves, or the like are not shown, but are intended to be included.

The apparatus of the figure includes an extractor 10, a fractional distillation column 11, a decanter 12, and a second fractional distillation column 13 (a decanter can be used instead of the extractor 10). In addition, extractor 10 is provided with a feed inlet line near the top thereof, a line from the top thereof leading to the top of column 11, and a line from the bottom thereof leading to the top of column 13. Column 11 is provided with an overhead distillate line leading to decanter 12, and also a bottoms draw-off line. Decanter 12 is provided with an oil layer draw-off line leading to the bottom of extractor 10, and a water layer draw-off line leading to the top of column 13. Column 13 may be heated with either direct or indirect steam, and is provided with an overhead distillate line leading to the top of extractor 10, and a bottoms draw-off line.

In order to facilitate a clear understanding of the invention, the following specific embodiments are included.

EXAMPLE 1

This example relates to the separation of anhydrous n-propanol from a constant boiling mixture thereof with water (71.7% n-propanol, and 28.3% water, by weight). These materials are mutually soluble in each other. Such a mixture may be obtained as a product from a distillation or concentrating column.

In order to clearly show its advantages, the process of the invention is compared with a usual azeotropic distillation process, using benzene as the entrainer. The usual process could be carried out in an apparatus somewhat similar to that of the figure; except that the extractor would not be used, and the feed would be directly into the top of column 11, the oil layer from decanter 12 would be returned to the top of column 11, and the overhead from column 13 would be passed to the decanter 12.

In the process of the invention, using the apparatus of the figure, the required amount of benzene may be introduced into the apparatus initially, or as needed, and the feed is continuously introduced near the top of extractor 10, while benzene is continuously introduced near the bottom of extractor 10. The benzene flows upwardly, counter-current to the descending aqueous liquid. Benzene containing extracted propyl alcohol and some water is removed from the top of extractor 10 and is passed to the top of column 11, wherein it is separated into an overhead mixture of propanol, benzene and water, and a bottoms which is the desired anhydrous n-propanol product. The overhead from column 11 is passed to decanter 12 where it is stratified, and the benzene layer therefrom is recycled to the bottom of extractor 10 and the aqueous layer is passed to the top of column 13. An aqeous mixture is withdrawn from the bottom of extractor 10 and is passed to the top of column 13. The aqueous mixture fed into column 13 is separated into an overhead mixture of n-propanol, benzene and water, and a bottoms which is stripped water and may be passed to the sewer. The overhead from column 13 is passed to the top of extractor 10 with the feed. The ternary constant boiling mixture contains 9.0% n-propanol, 82.4% benzene and 8.6% water, by weight.

The following table illustrates typical amounts of overhead distillates required for the process of the invention as compared to the usual azeotropic distillation. The amounts are given in pounds, on a basis of a feed of 100 pounds of the constant boiling mixture.

*Table I*

| | Usual Azeotropic Method | Ex. 1— Extraction plus Azeotropic Method |
|---|---|---|
| Column 11 Overhead Distillate: Ternary C. B. M.—n-propanol, benzene, water (total) | 385 | 179 |
| Column 13 Overhead Distillate: Ternary C. B. M.—n-propanol, benzene, water, plus Binary C. B. M.—n-propanol, water (total) | 3.9 | 8.0 |
| Overall Total | 388.9 | 187.0 |

It is apparent from the foregoing data that the process of the invention (Ex. 1) requires less than half of the overall distillate required for the usual method; i. e., the process of the invention cuts the steam requirement to less than half that of the usual method.

In the process of the invention, a much smaller amount of water relative to the n-propanol is fed into column 11, and this cuts down the amount of energy required to separate the water from the n-propanol. The above results are obtained by the preferred method, in which the feed to column 11 is a mixture containing about 35% n-propanol, about 6% water and about 59% benzene. The ratio of the n-propanol to water in the constant boiling feed mixture is about 2.5 to 1, but the ratio of n-propanol to water in the benzene extract feed into column 11 is nearly 6 to 1, in the preferred operation. The feed to column 10 may be more dilute than the C. B. M.; e. g., the usual concentrating column may be eliminated. A general lower limit is about 2 weight %, but even 1% or less is operable. The concentration of n-propanol in the benzene extract feed into column 11 may be in the range of 15 to 55 weight %, in accordance with the invention.

Although it is not intended to limit the invention by any theory, it is thought that the following discussion of fundamental principles may help clarify the invention. If a ternary diagram is prepared for the system n-propanol-benzene-water on a mol % basis, then the preferred composition of the feed to column 11 will be at the point of intersection with the phase compositions curve of a line connecting the points indicating pure n-propanol and the ternary C. B. M.

Analogous results are obtained in dehydrating a propanol mixture which may contain a higher alcohol, methyl ethyl ketone or higher boiling ketone, ether, ester, butyraldehyde or higher boiling aldehyde, propionic or higher boiling acid, or mixtures thereof.

EXAMPLE 2

This example is similar to Example 1, except that n-hexane is used as the solvent and entrainer. The overhead distillates from columns 11 and 13 include mixtures of n-propanol, n-hexane and water. The feed to column 11 contains 40.2 weight % n-propanol, 52.6% n-hexane and 7.2% water.

The following table illustrates typical amounts of overhead distillates required for the process of the invention as compared to the usual azeotropic distillation. The amounts are given in pounds, on a basis of a feed of 100 pounds of the constant boiling mixture.

Table II

|  | Usual Azeotropic Method | Ex. 2— Extraction plus Azeotropic Method |
|---|---|---|
| Column 11 Overhead Distillate: |  |  |
| Ternary C. B. M.— |  |  |
| n-propanol | 69 | 15 |
| n-hexane | 725 | 160 |
| water | 36 | 8 |
| Binary C. B. M.— |  |  |
| n-propanol |  | 36 |
| water |  | 14 |
| Total | 830 | 233 |
| Column 13 Overhead Distillate: |  |  |
| Ternary C. B. M.—n-propanol, n-hexane, water, plus Binary C. B. M.—n-propanol, water (total) | 8.1 | 21.9 |
| Overall Total | 838.1 | 254.9 |

It is apparent from the foregoing data that the process of the invention (Ex. 2) requires only about one-third the overhead distillate of the usual process; and this is reflected in a corresponding decrease in the steam requirement.

In an alternate procedure, only the ternary C. B. M. is taken off as overhead from column 11, and weighs 283 lbs.; and a 16.0 lbs. overhead is taken off as overhead from column 13. The overall total is 299.0 lbs.

If a ternary diagram is prepared for the above system on a mol % basis, then the preferred composition of the feed to column 11 will be at the point of intersection with the phase composition curve of a line parallel to the line connecting the points indicating the ternary C. B. M. and the n-propanol-water binary C. B. M. The concentration of n-propanol in the n-hexane extract feed into column 11 may be in the range of 5.5 to 52 weight %, preferably about 34.5 weight %, in accordance with the invention.

EXAMPLE 3

This example relates to the separation of anhydrous methyl ethyl ketone from a constant boiling mixture thereof with water (88.5% methyl ethyl ketone and 11.5% water, by weight). Such a mixture may be obtained as a product from a distillation or concentrating column.

This material is processed in a manner analogous to that of Example 2, using n-hexane as an entrainer.

The following table illustrates typical amounts of overhead distillates required for the process of the invention as compared to the usual azeotropic distillation. The amounts are given in pounds, on a basis of a feed of 100 pounds of the constant boiling mixture.

Table III

|  | Usual Azeotropic Method | Ex. 3— Extraction plus Azeotropic Method |
|---|---|---|
| Column 11 Overhead Distillate: |  |  |
| Ternary C. B. M.—methyl ethyl ketone, n-hexane, water (total) | 287.5 | 84.0 |
| Column 13 Overhead Distillate: |  |  |
| Ternary C. B. M.—methyl ethyl ketone, n-hexane, water, plus Binary C. B. M.—methyl ethyl ketone, water (total) | 1.4 | 2.6 |
| Overall Total | 288.9 | 86.6 |

It is apparent from the foregoing data that the process of the invention (Ex. 3) requires only about one-third the amount of overhead distillate, as compared to the usual process; and this is reflected in a corresponding decrease in the steam requirement.

The ratio of methyl ethyl ketone to water in the constant boiling mixture is about 9 to 1, but the ratio in the n-hexane extract feed to column 11 is about 32 to 1, in the preferred process of the invention wherein the extract contains 63% methyl ethyl ketone, 2% water and 35% n-hexane, by weight. Corresponding savings in steam may be made in the process of the invention, wherein the feed to column 11 contains 36 to 87.2 weight per cent of the ketone. A ternary diagram analysis of this system is analogous to that of Example 1.

The feed to column 10 may be more dilute than the C. B. M., e. g., the usual concentrating column may be eliminated. A general lower limit is about 2 weight %, but even 1% or less is operable. Analogous results are obtained in dehydrating a methyl ethyl ketone mixture which may contain a higher boiling ketone, iso-propanol or higher alcohol, ester, ether, butyraldehyde or higher boiling aldehyde, propionic or higher boiling acid, or mixtures thereof.

EXAMPLE 4

This example relates to separating a constant boiling mixture of pyridine and water containing 57.0% pyridine and 43.0% water, by weight, and the process is carried out in the apparatus of the figure, using benzene as the entrainer.

The following table illustrates typical amounts of overhead distillates required for the process of the invention as compared to the usual azeotropic distillation. The amounts are given in pounds, on a basis of a feed of 100 pounds of a constant boiling mixture.

Table IV

|  | Usual Azeotropic Method | Ex. 4— Extraction plus Azeotropic Method |
|---|---|---|
| Column 11 Overhead Distillate: |  |  |
| Binary C. B. M.— |  |  |
| benzene plus water | 514 | 103.5 |
| benzene plus pyridine | trace | 2.3 |
| Total | 514 | 105.8 |
| Column 13 Overhead Distillate: |  |  |
| Binary C. B. M.—benzene plus water, plus Binary C. B. M.—pyridine, water (total) | trace | 71.6 |
| Overall Total | 514 | 177.4 |

It is apparent from the foregoing data that the process of the invention (Ex. 4) requires only about one-third the overall distillate required for the usual method; i. e., the process of the invention cuts the steam requirement to about one-third of the usual method.

In this example, the feed to column 11 consists of about 61% benzene, 35% pyridine, and 4% water, by weight; and the feed to column 13 consists of about 1% benzene, 35% pyridine, and 64% water. The ratio of pyridine to water in the constant boiling mixture feed into extractor 10 is about 1.3 to 1; however, the ratio of pyridine to water in the feed to column 11 is about 8.75 to 1, an almost 7-fold difference. Corresponding savings in steam may be made in the process of the invention, wherein the feed to column 11 contains from 1.75 to 44 weight % of pyridine, preferably 41%.

The feed to column 10 may be more dilute than the C. B. M., e. g., the usual concentrating column may be eliminated. A general lower limit is about 2 weight %, but even 1% or less is operable. Analogous results are obtained in dehydrating a pyridine mixture which may contain methyl ethyl ketone or higher boiling ketone, isopropanol or a higher alcohol, ester, ether, butyraldehyde or a higher boiling aldehyde, or mixtures thereof.

Where the feed to the extractor contains a volatile impurity which is preferentially taken up by water, it is preferred to introduce a stream or feed of water at a point slightly higher than the main feed through a suitable line (not shown), to wash out this impurity. In such a case, column 13 would have to be operated so as to eliminate this impurity from the system, e. g., run as an extractive distillation column. This would be the case in any of the foregoing examples if the feed contained methanol, ethanol, acetone, acetaldehyde, or the like; or in the propanol or methyl ethyl ketone examples where the feed contains acetic acid.

For an aqueous system, the preferred entrainer is a hydrocarbon having 5 to 10 carbon atoms in the molecule, e. g., saturated acyclic or cyclic aliphatic, or aromatic or substituted aromatic compounds.

If desired, column 11 may be an extractive distillation type column, in the operation of which water or another diluent is introduced near the top thereof (through a suitable line, not shown).

Following the above type procedures, non-aqueous mixtures may be separated into their pure components.

The foregoing descriptions are for illustration only, and variations and modifications thereof may be made within the scope of the appended claims.

I claim:

1. An improved process for separating a pure compound selected from the group consisting of pyridine propanol and methylethylketone from a constant boiling solution thereof with water which comprises the steps of (1) premixing, in a separatory vessel said solution with an entrainer comprising a hydrocarbon of from 5 to 10 carbon atoms which forms with water an azeotrope having a boiling point lower than the boiling point of the binary azeotrope of said compound and water; (2) withdrawing an entrainer-rich phase comprising predominantly entrainer and said compound and an aqueous phase comprising predominantly water and said compound; (3) passing said entrainer-rich phase to a first distillation zone; (4) azeotropically distilling said entrainer-rich phase whereby there is obtained an overhead comprising water, entrainer and said compound and a bottoms comprising said pure compound; (5) collecting said overhead in a decanter and allowing said overhead to settle thereby obtaining an entrainer-rich layer comprising predominantly entrainer and said compound and an aqueous layer comprising predominantly water and said compound; (6) recycling the entrainer-rich layer to said first step; (7) passing said aqueous layer and said aqueous phase to a second distillation zone; (8) removing from said second distillation zone a bottoms comprising predominantly water and an overhead comprising an azeotropic mixture of water and said compound; and (9) recycling said last named overhead to said premixing step.

2. The process of claim 1 in which an oxygenated organic compound is separated from a constant boiling mixture thereof with water, and a hydrocarbon is used as the entrainer.

3. The process of claim 2 wherein pure n-propanol is recovered from a constant boiling mixture thereof with water.

4. The process of claim 3 wherein the entrainer is benzene.

5. The process of claim 3 wherein the entrainer is n-hexane.

6. The process of claim 2 wherein pure methyl ethyl ketone is recovered from a constant boiling mixture thereof with water.

7. The process of claim 6 wherein the entrainer is n-hexane.

8. The process of claim 1 wherein a heterocyclic nitrogen-containing organic compound is separated from a constant boiling mixture thereof with water, and a hydrocarbon is used as the entrainer.

9. A process according to claim 8 wherein pure pyridine is recovered from a constant boiling mixture thereof with water.

10. The process of claim 9 wherein the entrainer is benzene.

References Cited in the file of this patent

UNITED STATES PATENTS

| Number | Name | Date |
|---|---|---|
| 1,524,192 | Mann, Jr. | Jan. 27, 1925 |
| 2,050,235 | Othmer | Aug. 4, 1936 |
| 2,081,721 | Van Dijck et al. | May 25, 1937 |
| 2,542,752 | Cole | Feb. 20, 1951 |
| 2,582,214 | Twigg | Jan. 8, 1952 |
| 2,597,009 | Lobo et al. | May 20, 1952 |

FOREIGN PATENTS

| Number | Country | Date |
|---|---|---|
| 410,816 | Great Britain | May 18, 1934 |
| 442,051 | Great Britain | Jan. 31, 1936 |